(12) United States Patent
Sharp

(10) Patent No.: X8260
(45) Date of Patent: Jun. 14, 1834

(54) HAMMER, ARM FORGE

(76) Inventor: James Sharp

James Sharp of Spruce Creek Pennsylvania
Letters Patent

The Schedule referred to in these Letters Patent and making part of the same containing a description in the words of the said James Sharp himself of his improvement in the "Forge Hammer Arm".

To all to whom these presents shall come Be it known that I James Sharp, of Spruce Creek, in the County of Huntingdon, and State of Pennsylvania. have invented a new and useful improvement in the Forge Hammer Arm and that the following is a full and exact description of the construction and operation of the said machine as invented, or improved by me.

The Shaft by which the arm is to be set in motion is to be supported on each end, by an upright in which the axis plays. At one end of said Shaft is to be affixed the wheel or pulley. by which the motion is to be given, either by water, steam or other means. At the other end is to be a cylinder of wood, of size proportioned to the water wheel: and should one be used.

In this cylinder is to be inserted an arm of a peculiar construction to be described hereafter. This arm in the revolution of the cylinder is to raise the lever of the Hammer. thereby giving motion to the Hammer in its rise and fall.

The above mentioned arm or projection from the lever is called a tappet arm, and is to be made of cast iron of a square form let into the cylinder to a sufficient depth to give it hold, and to project far enough beyond, to raise the lever to the desired height.

The lower half of the under side, or the length of the arm or the side opposite to that, which comes in contact with the hammer lever, is hollowed into a semicircular groove extending as far up ~~as~~ the arm as it is to bedded into the cylinder. In this hollow is to be fitted a wooden key projecting as far above the face of the arm, as will be necessary to give it strength and elasticity tapering in a wedge shape towards the bottom. this forms the principle for tion of my improvement. as the wooden Key or wedge of this semicircular shape allows of a spring in the play of the arm; thereby securing its du-rability and lightness - The upper portion of the remaining side is to be rounded at the edge, and a portion of the metal dispensed with, in order to save weight in the upper part. On the side of said arm, either on the right or left, is to be left a small projection of the metal of the depth of the insertion in the cylinder for the purpose of securing the same in its situation under a band or hoop passing round the cylinder, and projecting over the mortice in the cylinder a space equal to the thickness of said projection of metal. a wedge is to be driven on the opposite side made of wood and thus forces the projection on the arm to the place under the hoop. Another hoop, or clasp, passes over the wedge and secures it also. this arm may be used either to the right or the left.

On the lower part of the Hammer lever is to be secured a plate of iron, on that part which comes in contact with the iron arm, thereby preserving its form from wear My claim is for the tappet arm as above described with its said appendages and arrangements.

In testimony that the above specification of my improvement is true and correct. I have hereunto set my hand the fifth day of June in the year of our Lord Eighteen hundred & thirty four Witnesses
Henry Stone
William Webb James Sharp (339)

(489 words)

(Patented June 14. 1834.)